(12) United States Patent
Ruol et al.

(10) Patent No.: US 7,167,594 B2
(45) Date of Patent: Jan. 23, 2007

(54) NOISE REDUCTION METHOD (75) Inventors: Vincent Ruol, Paris (FR); Sandra Del Corso, Clamart (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 511 days.

(21) Appl. No.: 09/995,458

(22) Filed: Nov. 27, 2001

(65) Prior Publication Data
US 2004/0120601 A1 Jun. 24, 2004

(30) Foreign Application Priority Data
Nov. 28, 2000 (FR) .................................. 00 15355

(51) Int. Cl.
*G06K 9/40* (2006.01)
(52) U.S. Cl. ....................... 382/266; 382/254; 382/260
(58) Field of Classification Search ................ 382/232, 382/236, 103, 199, 261, 254, 242, 243, 260, 382/266, 275; 348/606, 152, 420.1, 252, 348/164; 375/240.2, 240.24
See application file for complete search history.

(56) References Cited

U.S. PATENT DOCUMENTS

| 5,852,475 A | * | 12/1998 | Gupta et al. | ................. | 348/606 |
| 5,920,356 A | | 7/1999 | Gupta et al. | ................. | 348/606 |
| 5,974,197 A | | 10/1999 | Lee et al. | ................... | 382/268 |
| 6,469,734 B1 | * | 10/2002 | Nichani et al. | ............. | 348/152 |

* cited by examiner

*Primary Examiner*—Anh Hong Do (57) ABSTRACT

A method of reducing noise in images formed by uniform regions and textures delimited by edges, comprises a step of filtering these images, a step of detecting edges in these images, a sub-step of re-assigning or no re-assigning each image pixel to an edge or a texture in accordance with the result of a connectivity test, this sub-step taking place at the end of the step of detecting edges and textures and a selection step of eliminating or applying this filtering to each image pixel according to whether this image pixel is associated or not associated with an edge or a texture.

7 Claims, 6 Drawing Sheets

$$S_{Ha} = \begin{bmatrix} -1 & 0 & 1 \\ -2 & 0 & 2 \\ -1 & 0 & 1 \end{bmatrix} \quad S_{Va} = \begin{bmatrix} -1 & -2 & -1 \\ 0 & 0 & 0 \\ 1 & 2 & 1 \end{bmatrix}$$

FIG 4a

$$S_{Hb} = \begin{bmatrix} -1 & 0 & 1 \\ -2 & -1 & 2 \\ -1 & 0 & 1 \end{bmatrix} \quad S_{Vb} = \begin{bmatrix} -1 & -2 & -1 \\ 0 & -1 & 0 \\ 1 & 2 & 1 \end{bmatrix}$$

FIG 6

NOISE REDUCTION METHOD

FIELD OF THE INVENTION

The invention relates to a method of reducing noise in images formed by uniform regions and textures delimited by edges, the method comprising, in parallel, the steps of:
  filtering said images, and
  detecting edges and textures in these images,
  and a selection step of eliminating or, in contrast, applying said filtering to each image pixel according to whether this image pixel is associated or not associated with an edge or a texture.

The invention also relates to a system for processing images allowing this method to be carried out, and a computer program intended to carry out this method. The invention may be used, for example, in image encoding systems such as MPEG2 encoders.

DESCRIPTION OF THE PRIOR ART

The methods of acquiring images, such as from cameras or amplifiers, induce different perturbations which are referred to as "noise", which may be troublesome for comprehension and processing of the images. This noise degrades the quality of the image and increases the necessary memory for storing an image when this image is compressed. The use of filters allows a reduction of this noise but degrades the edges and textures of the image. The textures are the non-uniform parts of the image, for example, a lawn, as contrasted to the uniform parts of the image such as a blue sky without clouds.

The typical architecture of a noise reduction device as described in FIG. 5 of U.S. Pat. No. 5,974,197 comprises a filtering step and a step of detecting edges and textures by which the filtering operation may be performed or not performed on an image pixel according to whether this pixel is associated or not associated with an edge or a texture.

SUMMARY OF THE INVENTION

It is a first object of the invention to provide a method allowing improvement of the selection criterion for selective filtering.

According to the invention, a noise reduction method as defined in the opening paragraph has the following characteristic features. The noise reduction method also comprises, at the end of the step of detecting edges and textures, a sub-step of re-assigning or not re-assigning to each image pixel an edge or a texture in accordance with the result of a connectivity test.

It is a second object of the invention to provide a computer program for performing this method.

A third object of the invention is to provide a system for processing images, allowing said method to be carried out.

The invention takes the following aspects into consideration. The noise plays an important role in encoding image sequences such as MPEG (abbreviation of Moving Pictures Expert Group). The noise in a sequence of images is troublesome not only because it degrades the quality of the image but also because it complicates the encoding of this sequence of images. The compression is realized by using the redundancy of the elements which are present in the image sequence. As, by definition, the random noise has not any redundancy, its coding is more difficult than the coding of a redundant element, which is the reason why the number of bits used for coding a sequence of noisy images is larger than for a sequence of images which is not beset with noise.

In accordance with the prior art, the treatment of a sequence of images for reducing the noise in this sequence of images before encoding this sequence of images has the following characteristic features. A first filtering device is used so as to eliminate the pulse noise in the sequence of images. With this first filtering device, a second sequence of images can be obtained in which a part of the noise has disappeared and in which the edges and the textures are conserved. A second filtering device is subsequently used for the second sequence of images in order to eliminate the temporal noise. This second device of filters generally degrades the edges and renders the textures fuzzy. For limiting the degradation of edges and textures, a device for detecting edges and textures is used so that the second filtering device is not used for the pixels associated with edges and textures of the second sequence of images and the second filtering device is used for the pixels of the second sequence of images which are not associated with either the edges or the textures. A third sequence of images can thereby be obtained, in which a large part of the noise has disappeared and the edges and textures are conserved.

However, a part of the noise present in the sequence of unprocessed images is not filtered by the first filtering device and is considered to be part of the edges and textures by the device for detecting edges and textures. This noise is thus not filtered by the second filtering device and is present in the third sequence of images, which complicates the encoding.

The following principle allows reduction of the part of the noise which persists in the third sequence of images. After using the device for detecting edges and textures, a device with which a connectivity test can be performed is used for the second sequence of images. A binary image is generated by the device for detecting edges and textures while the pixels associated with edges or textures are given the value 1 and the pixels not associated with either edges or textures are given the value 0. For each pixel having the value 1, the device with which the connectivity test can be carried out counts the number of adjacent pixels having the value 1. If this number is larger than or equal to a given threshold N (N being an integral number between 1 and 8), the corresponding pixel is considered to be associated with an edge or with a texture. If this number is strictly lower than the same threshold N, the corresponding pixel is considered to be not associated with either an edge or a texture. The pixels of the binary image generated by the device for detecting edges and textures and having the value 0 are not processed by the device for performing the connectivity test and keep their value 0.

These and other aspects of the invention are apparent from and will be elucidated, by way of non-limitative example, with reference to the embodiment(s) described hereinafter.

DESCRIPTION OF PREFERRED
EMBODIMENTS

Figure 1:
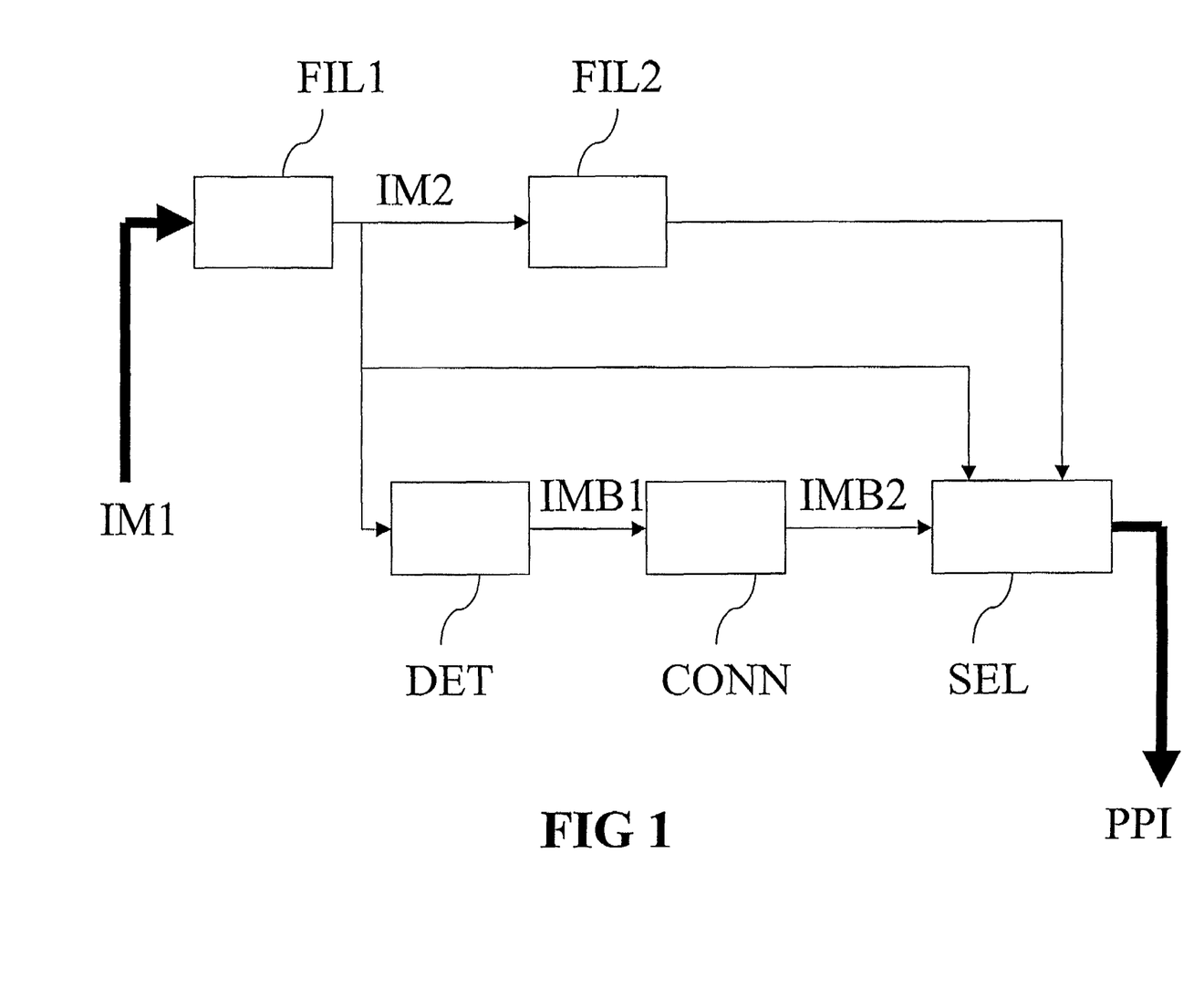
FIG. 1 is a diagram illustrating the characteristic features of the invention.

FIG. 1 illustrates characteristic features of the invention as described hereinbefore. A system for treating images comprises a first filtering device [FIL1], a second filtering device [FIL2], a device [DET] for detecting edges and textures, a device [CONN] for forming a connectivity test, and a selection device [SEL].

A first image sequence [IM1] is applied to the input of the first filtering device [FIL1]. The role of this first filtering device [FIL1] is to eliminate all the pixels in the first image sequence [IM1] that appear in the form of noise, particularly pixels beset with pulse noise. The first filtering device [FIL1] is a device used for eliminating a part of this noise while conserving the edges and the textures. A second image sequence [IM2] is obtained at the output of this first filtering device [FIL1]. The second image sequence [IM2] is applied to the input of the device [DET] for detecting edges and textures. This device [DET] for detecting edges and textures generates a first sequence of binary images [IMB1] from the second image sequence [IM2], while the pixels considered as being associated with an edge or with a texture receive the value 1 and the pixels considered to be not associated with an edge or a texture receive the value 0. This first sequence of binary images [IMB] is applied to the input of the device [CONN] for performing the connectivity test. For each pixel of the first sequence of binary images [IMB1] having the value 1, the device [CONN] for performing the connectivity test counts the number of adjacent pixels having the value 1. If this number is higher than or equal to a given threshold N (wherein N is an integral number between 1 and 8), the corresponding pixel is considered to be associated with an edge or with a texture and thus keeps its value 1. If this number is strictly lower than the same threshold N, the corresponding pixel is considered to be not associated with an edge or a texture and thus receives the value 0. The pixels of the first sequence of binary images [IMB1] having the value 0 keep this value 0. Thus a second sequence of binary images [IMB2] is obtained at the output of the device [CONN] for performing the connectivity test. The selection device allows the use of the second filtering device [FIL2] for a pixel of the second image sequence [IM2] if the corresponding pixel in the second sequence of binary images [IMB2] has the value 0 and does not allow the use of the second filtering device [FIL2] for a pixel of the second image sequence [IM2] if the corresponding pixel in the second sequence of binary images [IMB2] has the value 1. A pre-processed sequence of images [PPI] can be obtained with the selection device [SEL].

Figure 2:
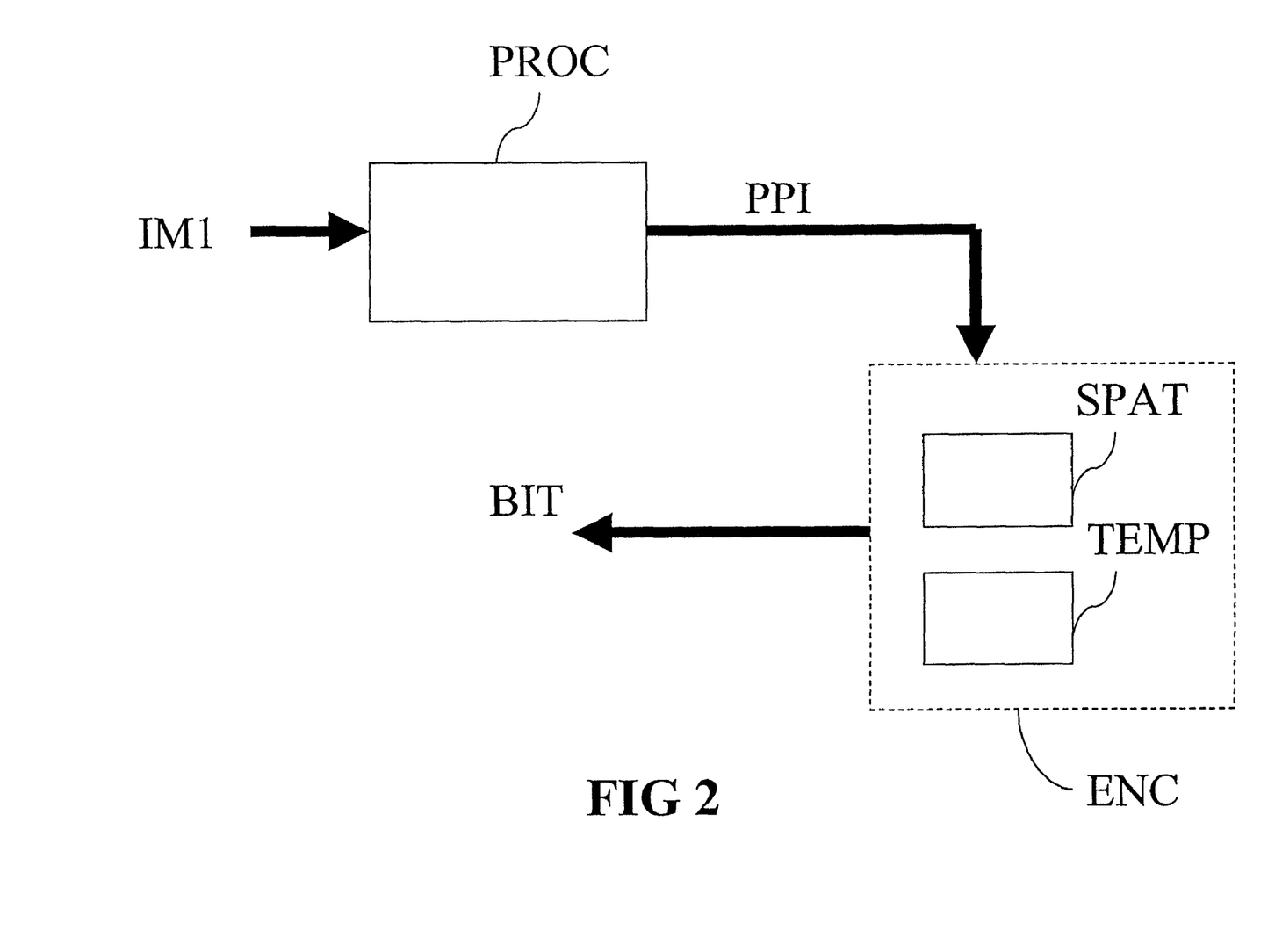
FIG. 2 is a block diagram illustrating an example of using the invention in a video encoding sequence.

FIG. 2 shows an example of using the invention in an MPEG2 video encoding device. The MPEG2 video encoding device comprises an image-processing device [PROC] and an MPEG2 encoder [ENC] comprising a device [SPAT] for realizing a spatial compression and a device [TEMP] for realizing a temporal compression.

The first image sequence [IM1] is applied to the input of the image processing device [PROC] described with reference to FIG. 1. A pre-processed sequence of images [PPI] is thus obtained at the output of this image processing device [PROC]. This pre-processed image sequence [PPI] is encoded by the MPEG2 encoder [ENC] and binary data [BIT] encoding this pre-processed image sequence [PPI] are obtained.

The spatial compression device [SPAT] analyzes the pre-processed image sequence [PPI] for determining the redundant information within an image of this pre-processed image sequence [PPI] and eliminates the frequencies which are not visible to the human eye. The spatial compression device [SPAT] uses a DCT (Discrete Cosine Transform) which converts the information in an image of the pre-processed image sequence [PPI] of the spatial domain into the frequency domain so as to eliminate the frequencies having a low amplitude and the high frequencies which are not perceptible to the human eye.

The temporal compression device [TEMP] uses the differences between the successive images of the pre-processed image sequence [PPI]. The first image of the pre-processed image sequence [PPI] comprises all the information which is necessary for describing the following images when there is no motion. It is thus not necessary to encode the information of the images following the first image of the sequence of pre-processed images [PPI] when there is no motion. Consequently, it is sufficient to only encode the motion information in an image which follows the first image of the pre-processed image sequence [PPI]. The temporal compression device [TEMP] successively uses a motion estimation, a motion compensation and a prediction, with which the quantity of information relative to the motion between 2 images of the pre-processed sequence of images [PPI] can be determined.

Figure 3:
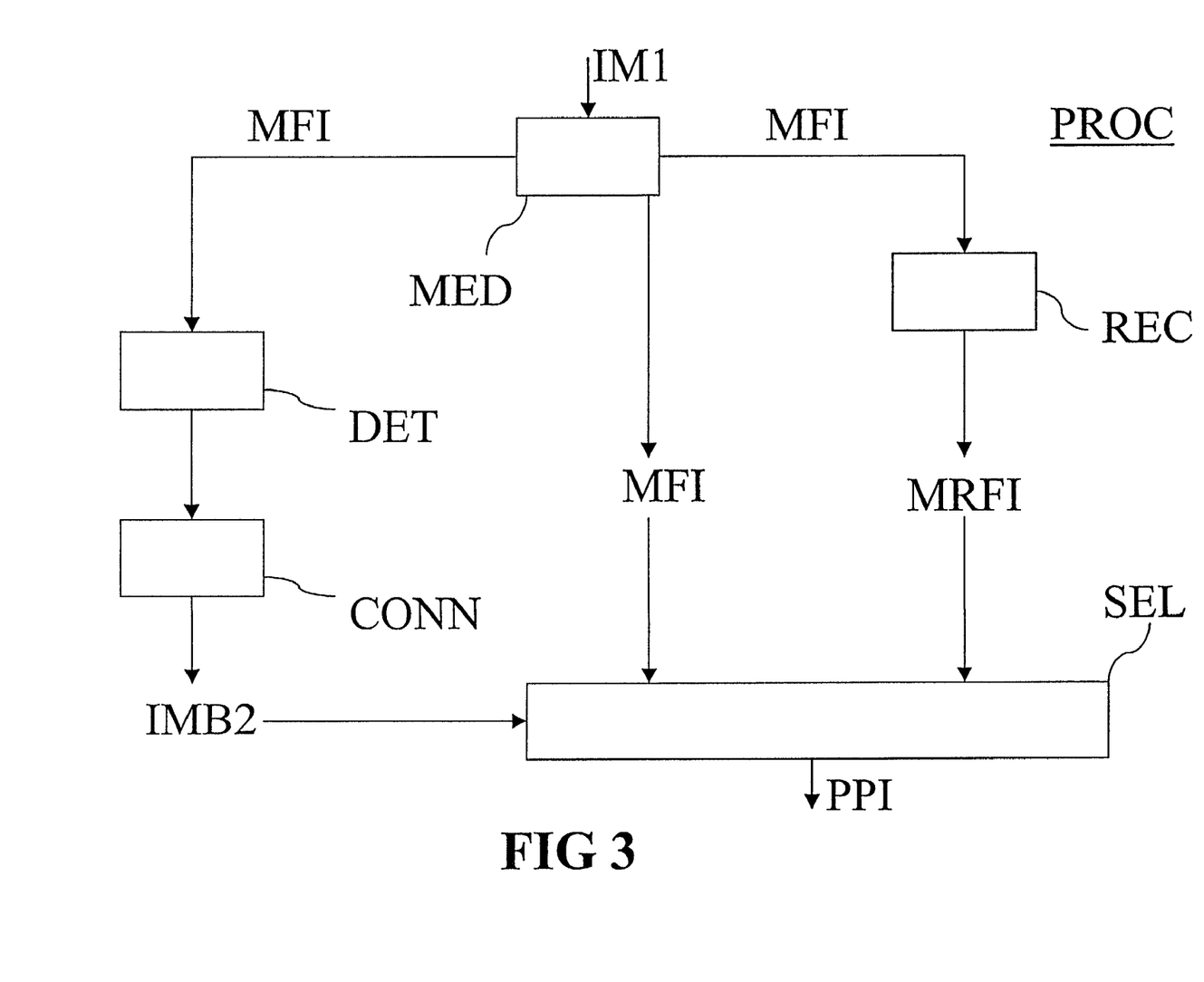
FIG. 3 is a block diagram illustrating an embodiment of the invention.

FIG. 3 illustrates an embodiment of the invention. The image-processing system [PROC] shown in FIG. 2 comprises a median filter [MED], a spatio-temporal recursive filter [REC], the device [DET] for detecting edges and textures, the device [CONN] for performing the connectivity test and the selection device [SEL].

The first image sequence [IM1] is applied to the input of the median filter [MED]. The role of this median filter [MED] is to eliminate high-frequency noise such as shot noise caused by random fluctuations of the electric signal during acquisition of the first image sequence [IM1] while preserving the edges and the textures. The median filter [MED] is a non-linear filter acting on the neighborhood of a given pixel in one of the images of the first image sequence [IM1]. For example, the median filter may act on a neighborhood comprising the given pixel and its 8 most proximate neighbors. The grey levels of these 9 pixels are sorted by increasing values and the central pixel receives the median value of these 9 grey levels. This operation is performed for all the pixels of all the images of the first image sequence [IM1] so as to obtain a sequence of median filtered images [MFI]. The edge and texture detection and the connectivity test are realized on the basis of the sequence of median-filtered images [MFI] as described with reference to FIG. 1 and allows the second sequence of binary images [IMB2] to be obtained. The sequence of median filtered images [MFI] is also processed by the spatio-temporal recursive filter [REC] so as to give a sequence of recursive median-filtered images [MRFI]. The role of this spatio-temporal recursive filter [REC] is to smooth the image so as to eliminate a part of the noise that has not been eliminated by the median filter [MED]. The spatio-temporal recursive filter [REC] is a structure of the Kalman filter type. The role and function of the selection device [SEL] will be described with reference to FIG. 6. The sequence of pre-processed images [PPI] is obtained at the output of this selection device [SEL].

Figure 4A:
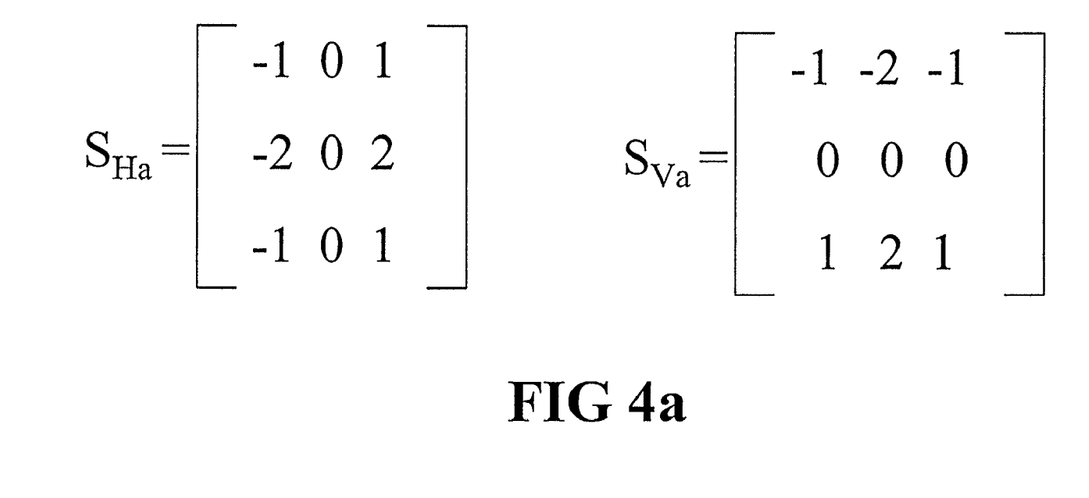
FIGS. 4*a* and 4*b* illustrate a filter for detecting edges and textures.

FIG. 4a illustrates a filter with which edges and textures can be detected. The filter comprises a horizontal Sobel mask [$S_{Ha}$] and a vertical Sobel mask [$S_{Va}$].

The method allowing detection of edges and textures will now be described. For a given pixel P in a sequence of images in which one wishes to detect the edges and the textures, one considers the neighborhood V constituted by this pixel P and its 8 most proximate neighbors. The horizontal Sobel mask [$S_{Ha}$] is placed on this neighborhood and the 9 products of the grey level of each pixel of the neighborhood V are effected by the value of the horizontal Sobel mask [$S_{Ha}$] covering each pixel. Subsequently, the sum $\Sigma_{Ha}$ of these 9 products is computed. The vertical Sobel mask [$S_{Va}$] is placed on this neighborhood and the 9 products of the grey level of each pixel of the neighborhood V is effected by the value of the vertical Sobel mask [$S_{Va}$] covering each pixel Subsequently, one computes the sum $\Sigma_{Va}$ of these 9 products. Then, the sum $\Sigma_a$ of the square values of $\Sigma_{Ha}$ and $\Sigma_{Va}$ is computed. Thereafter, a threshold S is fixed as a function of the desired level of edge and texture detection. If the sum $\Sigma_a$ is larger than the threshold S, the pixel P is considered to be associated with an edge or with a texture and receives the value 1. If the sum $\Sigma_a$ is smaller than this threshold S, the pixel P is considered to be not associated with an edge or a texture and receives the value 0. This operation is carried out for all the piixels of all the images of the image sequence in which the edges and textures are to be detected. A binary sequence of images is thus obtained in which the pixels considered as being associated with an edge or a texture have the value 1 and the pictures considered as being not associated with an edge or a texture have the value 0. The drawback of this filter is that it is not very effective for detecting the textures.

Figure 4B:
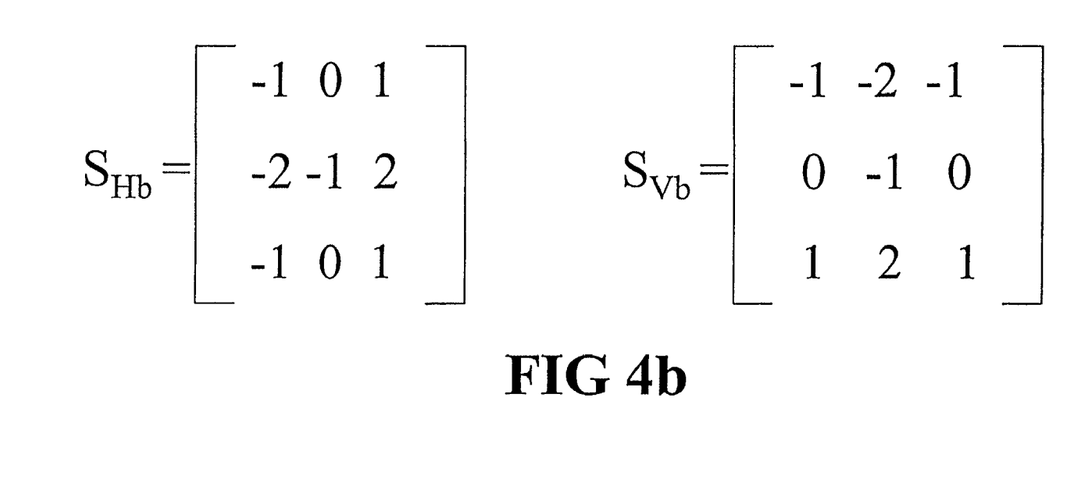

FIG. 4b illustrates another filter with which the edges and textures can be detected. The filter comprises a horizontal Sobel mask [$S_{Hb}$] and a vertical Sobel mask [$S_{Vb}$] which differs only from [$S_{Ha}$] and [$S_{Va}$] by their central values.

The method allowing detection of edges and textures is the same as that described with reference to FIG. 4a. The advantage of this filter is that it is more effective than the filter described in FIG. 4a for detecting the textures.

Figure 5A:
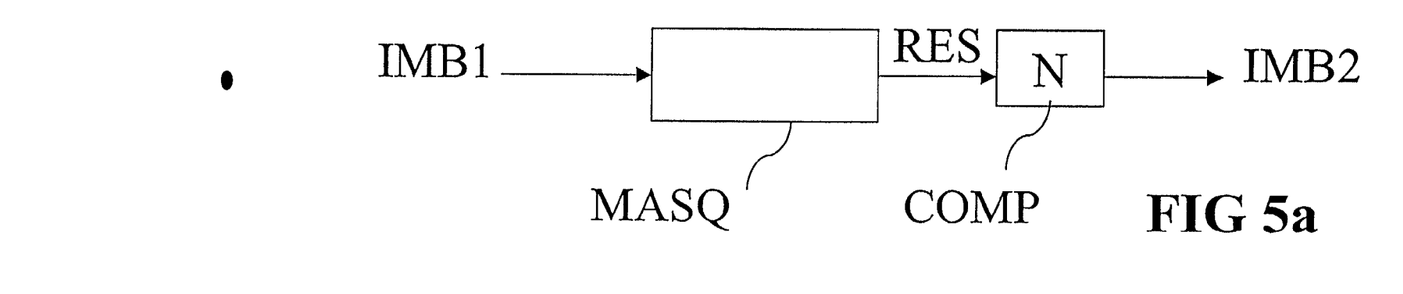
FIG. 5*a* is a block diagram illustrating a method of realizing the connectivity test and FIGS. 5*b* and 5*c* illustrate an example of the connectivity test.

FIG. 5a illustrates a method for the connectivity test device [CONN] of FIG. 1. The connectivity test device [CONN] comprises a mask filter [MASQ] and a comparator [COMP].

The first sequence of binary images [IMB1] at the output of the device for detecting edges and textures is applied to the input of the mask filter [MASQ]. This mask filter [MASQ] generates a result [RES] which is compared with a threshold N (N being an integral number between 1 and 8) by the comparator [COMP]. The second sequence of binary images [IMB2] can be obtained with this comparator. The mask filter [MASQ] comprises 9 values, all of which are 1 except the central value of the mask filter [MASQ].

The connectivity test device [CONN] operates as follows. For a given pixel P (having the value 1) in the first sequence of binary images [IMB1], one considers the neighborhood V constituted by this pixel P and its 8 most proximate neighbors. The mask filter [MASQ] is placed on this neighborhood and the 9 products of the grey level of each pixel of the neighborhood V are effected by the value of the mask filter [MASQ] covering each pixel. The sum of these 9 products is subsequently computed for obtaining the result [RES]. It is easy to note that this result [RES] corresponds to the number of adjacent pixels of the pixel P having the value 1, i.e. being considered at the output of the texture and edge detection device as being associated with an edge or with a texture. If this result [RES] is higher than or equal to the threshold N, the pixel P is considered as being associated with an edge or with a texture and the value of the pixel of the second sequence of binary images [IMB2] corresponding to the pixel P will be 1. If this result [RES] is strictly lower than the threshold N, the pixel P is considered as being associated with neither an edge nor a texture and the value of the pixel of the second sequence of binary images [IMB2] corresponding to the pixel P will be 0. The pixels having the value 0 in the first sequence of binary images [IMB1] are not processed by the device [CONN] for performing the connectivity test and keep the value 0 in the second sequence of binary images [IMB2].

Figure 5B:
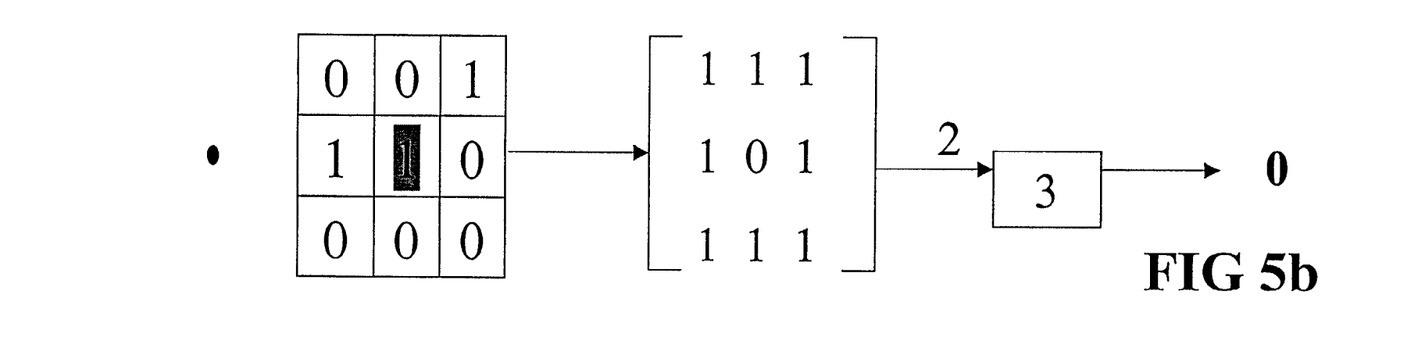

FIG. 5b illustrates an example which makes the operation of the device [CONN] for performing the connectivity test readily understood. In this example, the threshold N is fixed at 3. For a pixel P (having the value 1) in the first sequence of binary images [IMB1] having only 2 adjacent neighbors associated with an edge or with a texture, the result [RES] at the output of the mask filter [MASQ] is 2. As this figure is strictly smaller than the threshold N fixed at 3, the value of the pixel of the second sequence of binary images corresponding to the pixel P will be 0.

Figure 5C:
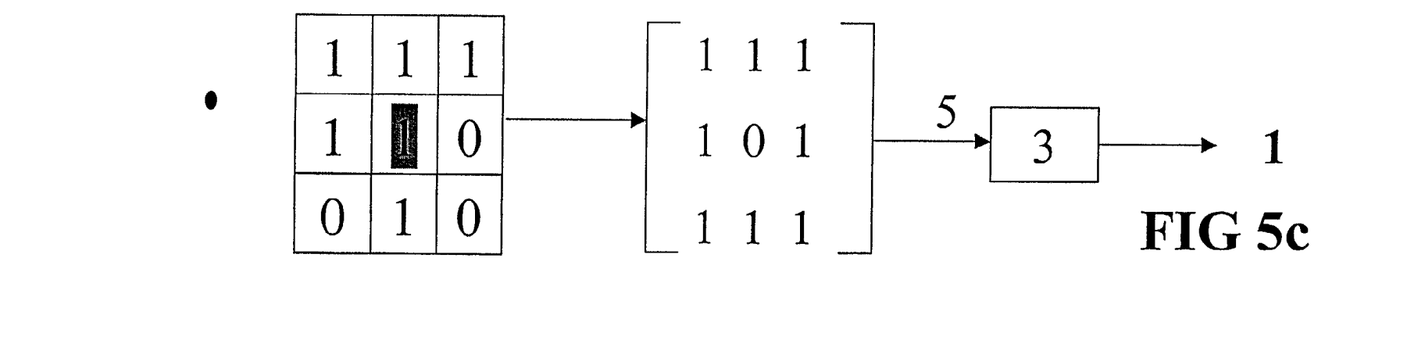

FIG. 5c illustrates another example by which the operation of the device [CONN] for performing the connectivity test can be readily understood. In this example, the threshold N is fixed at 3. For a pixel P (having the value 1) in the first sequence of binary images [IMB1] having 5 adjacent neighbors associated with an edge or with a texture, the result [RES] at the output of the mask filter [MASQ] is 5. As this figure is higher than the threshold N fixed at 3, the value of the pixel of the second sequence of binary images [IMB2] corresponding to the pixel P will be 1.

Figure 6:
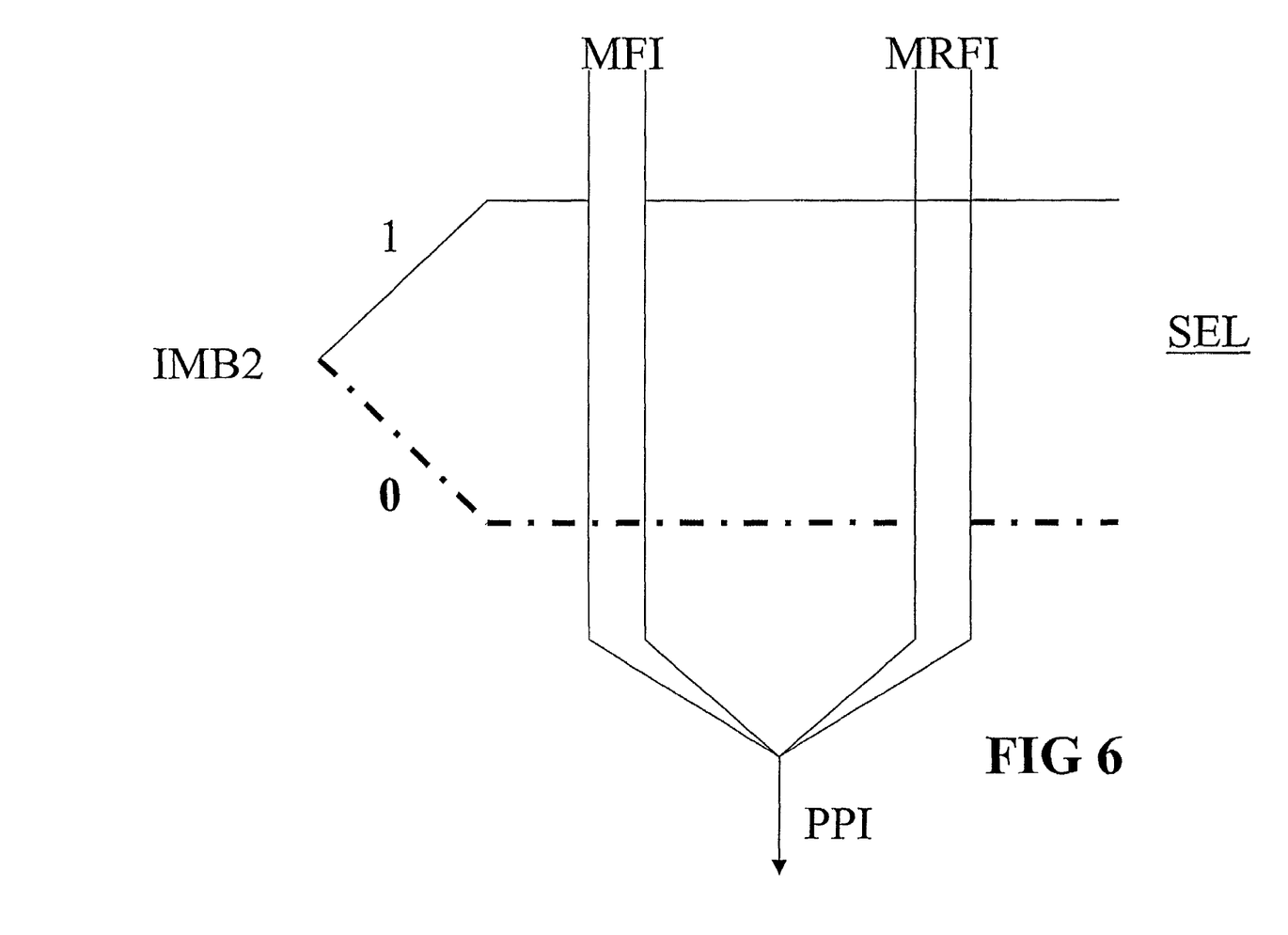
FIG. 6 is a block diagram illustrating an embodiment of the selection device.

FIG. 6 illustrates an example of the selection device [SEL] shown in FIG. 3. The signs between brackets in the description of this Figure and not shown in this Figure refer to FIG. 3. The second sequence of binary images [IMB2] at the output of the device [CONN] for performing the connectivity test serves as a command for the selection device [SEL]. This second sequence of binary images [IMB2] is constituted by pixels which have the value of 1 when they are considered as being associated with an edge or with a texture and a value of 0 when they are considered as being not associated with an edge or a texture. When a given pixel of the second sequence of binary images [IMB2] has the value of 1, the corresponding pixel in the pre-processed sequence of images [PPI] is the corresponding pixel in the sequence of median-filtered images [MFI]. When a given pixel of the second sequence of binary images [IMB2] has the value of 0, the corresponding pixel in the sequence of pre-processed images [PPI] is the corresponding pixel in the sequence of recursive median-filtered images [MRFI].

The system for processing images illustrated in FIGS. 2 to 6 is an example of using the characteristic features illustrated in FIG. 1. The filtering devices [FIL1, FIL2] shown in FIG. 1 have the form of a median filter [MED] and a spatio-temporal recursive filter [REC], respectively.

The description above with reference to the Figures illustrates rather than limits the invention. It is evident that there are numerous alternatives within the scope of the appendant claims. In this respect, several remarks will be made below.

There are numerous ways of detecting the edges and the textures in a given sequence of images. FIG. 4 only shows a possible way in which the masks used are derived from the conventional Sobel masks which apply to a neighborhood comprising 9 pixels. It is possible to use other masks for detecting the edges and the textures, with different dimensions.

There are numerous ways of performing a connectivity test in a given sequence of images. FIG. 5 only illustrates a possible way in which the connectivity test is realized by using a mask which is applied to a neighborhood comprising 9 pixels. It is possible to use other masks for performing the connectivity test, with different dimensions.

The invention claimed is:

1. A method of reducing noise in images formed by uniform regions and textures delimited by edges, the method comprising the steps of:

filtering said images, detecting edges and textures in theses images, and a selection step of eliminating or applying said filtering to each image pixel according to whether this image pixel is associated or not associated with an edge or a texture, characterized in that the method comprises, at the end of the step of detecting edges and textures, a sub-step of retaining each edge or texture-detected image pixel as an edge or a texture image pixel in accordance with the result of a connectivity test.

2. A computer program, accessible from a computer-readable medium, which can be executed by means of a processor intended to carry out a noise reduction method as claimed in claim 1.

3. A video encoding sequence of the MPEG type preceded by a noise reduction method as claimed in claim 1.

4. A system for processing images formed by uniform regions and textures, delimited by edges, the system comprising, in parallel:

a device for filtering said images;

a device for detecting edges and textures in said images;

and a selection device for eliminating or applying said filtering to each image pixel according to whether this image pixel is associated or not associated with an edge or a texture, characterized in that the system comprises, at the output of said device for detecting edges and textures, a connectivity test device for retaining the assignment of each edge or texture-detected image pixel as an edge or texture image pixel in accordance with a predetermined criterion.

5. A system for processing images as claimed in claim 4, characterized in that said connectivity test device comprises:

a mask filter, a comparator to compare the output of this filter with a predetermined number, and a decision circuit for retaining each edge or texture-detected image pixel as an edge as an edge or texture image pixel when the predetermined number is achieved.

6. A video encoding sequence of the MPEG type preceded by a system for processing images as claimed in claim 4.

7. The system as recited in claim 4, wherein the predetermined criterion is a predetermined number.

* * * * *